United States Patent
Nishino (10) Patent No.: US 8,151,028 B2
(45) Date of Patent: Apr. 3, 2012

(54) INFORMATION PROCESSING APPARATUS AND CONTROL METHOD THEREOF

(75) Inventor: Shuji Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 12/370,977

(22) Filed: Feb. 13, 2009

(65) Prior Publication Data

US 2009/0216930 A1 Aug. 27, 2009

(30) Foreign Application Priority Data

Feb. 27, 2008 (JP) ................................. 2008-045888

(51) Int. Cl.
*G06F 13/26* (2006.01)
(52) U.S. Cl. ........................................ 710/264; 710/266
(58) Field of Classification Search .................. 710/260, 710/262–269
See application file for complete search history.

(56) References Cited

U.S. PATENT DOCUMENTS

| | | | | |
|---|---|---|---|---|
| 4,325,119 A * | 4/1982 | Grandmaison et al. | ........... | 710/5 |
| 5,228,130 A * | 7/1993 | Michael | .............. | 710/8 |
| 5,530,872 A * | 6/1996 | Smeltzer et al. | .............. | 710/260 |
| 5,689,726 A * | 11/1997 | Lin | .................. | 710/10 |
| 5,768,599 A * | 6/1998 | Yokomizo | ..................... | 710/260 |
| 5,850,555 A * | 12/1998 | Qureshi et al. | ................ | 710/260 |
| 5,850,558 A * | 12/1998 | Qureshi et al. | ................ | 710/269 |
| 5,892,956 A * | 4/1999 | Qureshi et al. | ................ | 710/260 |
| 6,553,443 B1 * | 4/2003 | Baqai et al. | .................... | 710/264 |
| 6,754,738 B2 * | 6/2004 | Brice et al. | ....................... | 710/48 |
| 6,978,331 B1 * | 12/2005 | Kagan et al. | .................. | 710/268 |
| 7,526,592 B2 * | 4/2009 | Tsuruta | .......................... | 710/268 |
| 2006/0230208 A1 * | 10/2006 | Gregg et al. | ................... | 710/260 |
| 2007/0143516 A1 * | 6/2007 | Sato | .............................. | 710/264 |
| 2009/0210584 A1 * | 8/2009 | Carlson et al. | .................. | 710/36 |
| 2010/0030920 A1 * | 2/2010 | Casper et al. | ....................... | 710/5 |

FOREIGN PATENT DOCUMENTS

| | | |
|---|---|---|
| JP | 54-14133 | 2/1979 |
| JP | 54-014133 | 2/1979 |
| JP | 61-233837 | 10/1986 |
| JP | 4-363748 | 12/1992 |
| JP | 04-363748 | 12/1992 |

OTHER PUBLICATIONS

"82371AB PCI-TO-ISA/ IDE XCELERATOR (PIIX4)", Intel Data Sheet, XP-007900380, Apr. 1997.
Communication from the European Patent Office dated May 6, 2009 in the corresponding European patent application.

* cited by examiner

*Primary Examiner* — Khanh Dang
(74) *Attorney, Agent, or Firm* — Staas & Halsey LLP (57) ABSTRACT

An information processing apparatus connected with an IO device, having a processing unit, a channel device transferring data between the information processing apparatus and the IO device having a activation controller activating the channel device, a storage device having a predetermined area storing a result operation executed by the channel device, an interrupt controller controlling an interrupt required by the channel device to the processing unit, a channel device controller controlling the channel device and a driver writing a request for a first interrupt in the area of the storage device through the channel device and requiring the first interrupt to the processing unit by using the interrupt controller, wherein the processing unit executes driver commands for reading information stored in the area and requesting the first interrupt when the processing unit detects the request for the first interrupt.

3 Claims, 9 Drawing Sheets

(1) IOP/DRIVER→COMMAND TO CHANNEL DEVICE
(2) CHANNEL DEVICE→INTERRRUPT TO IOP/DRIVER

PRIOR ART

INFORMATION PROCESSING APPARATUS AND CONTROL METHOD THEREOF

CROSS-REFERENCE TO RELATED APPLICATIONS

This application is based upon and claims the benefit of priority of the prior Japanese Patent Application No. 2008-45888, filed on Feb. 27, 2008, the entire contents of which are incorporated herein by reference.

FIELD

Various embodiments of the present invention relate to an information processing system having an information processing device, an input-output (IO) device connected with the information processing device and a channel device transferring data between the information processing device and the IO device.

BACKGROUND

Conventionally, basic operations of companies are processed by mainframes of computers. The mainframes are often called general-purpose computers, general-purpose machines or general-purpose large computers. Typically, the mainframes are connected to various IO devices.

Figure 9:
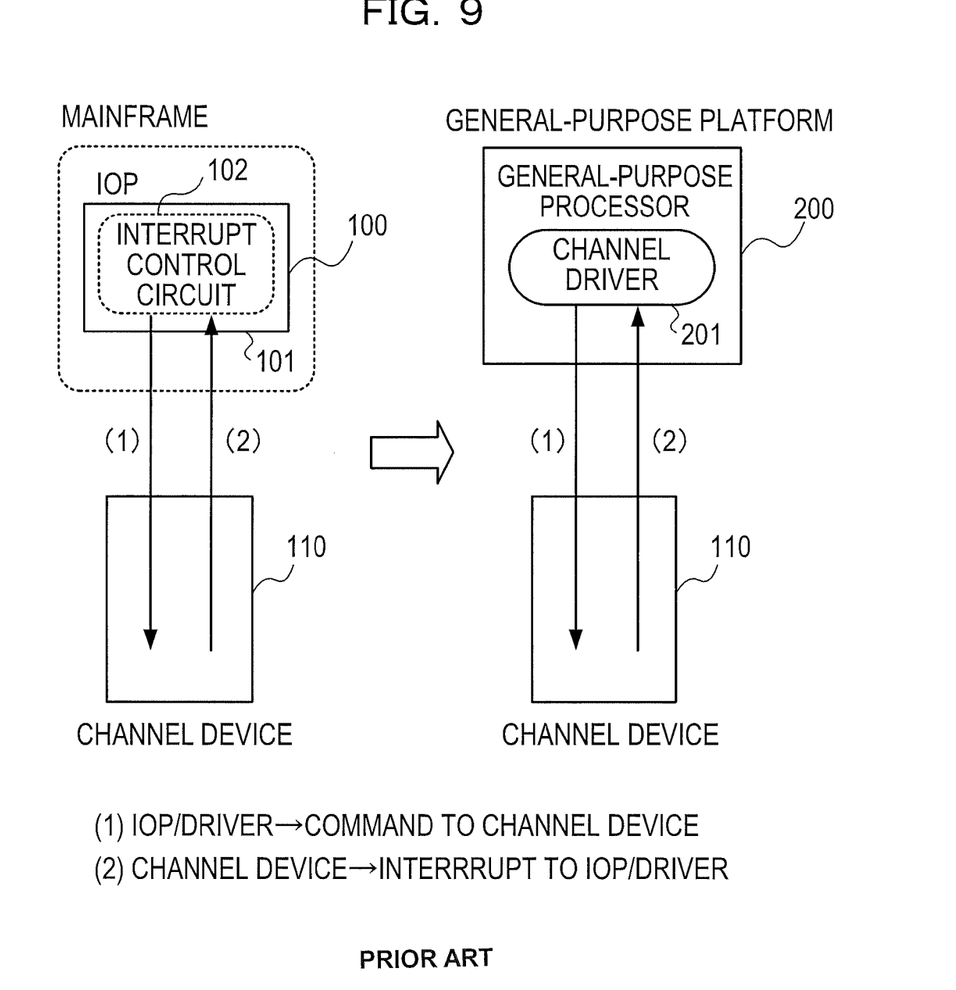
FIG. 9 is an explanatory diagram illustrating a prior art.

Traditionally, the mainframes have specifically designed circuit or dedicated hardware. For example, IO processor 101 included in mainframe 100 has a specifically designed interrupt control circuit 102, as shown in FIG. 9. IO processor 101 controls data transmission and receipt between one or more IO devices through channel device 110. Channel device 110 controls data transfers between mainframe 100 and the IO devices. The IO devices are, for example, storage devices include in Redundant Arrays of Inexpensive Disks or Redundant Arrays of Independent Disks (RAID) configuration. Interrupt control circuit 102 has hardware circuits and receives interrupts required by one or more channel devices 110 and issues necessary commands to channel devices 110.

Recently, there has been a trend to use general-purpose platforms having the general-purpose processors for implementing large-scale systems. As the general-purpose platform, server systems using operating systems such UNIX (a registered trademark), Linux or Windows (a registered trademark) have been introduced. By using the server systems, costs and periods of developments are reduced and an ease of maintenance is improved.

When shifting to the general-purpose platforms, most users demand to maintain their system as before. For example, to emulate mainframe 100 in platform 200, interrupts to mainframe 100 are controlled as before, as shown in FIG. 9. Thus, channel driver 201 is mounted in general-purpose platform 200 to receive the interrupts required by channel device 110.

Japanese Unexamined Patent Application Publication No. H04-363748 discloses that a central processing unit (CPU) uses a bus provided between a main memory and relinquishes the bus on requests for interrupts required by the channel devices. A direct memory access (DMA) controller or an interrupt controller control the requests from multiple channel devices and select the channel device that the CPU allows to interrupt. A priority of the channel device whose request is accepted is updated to the lowest priority and a channel device prioritized next to the channel device is reprioritized the highest priority by a method to control the requests for interrupt priorities from multiple channel devices.

Japanese Unexamined Patent Application Publication No. S54-14133 discloses an IO channel control method in which a CPU having multiple IO channel devices executes input and output operations with a time-sharing method. A CPU determines priorities of the input and output operations executed by the IO channel devices and the multiple subchannels of the multiple IO channel devices with a machine instruction depending on the IO control devices and according to processing speed of the IO control devices. Therefore, the input and output operations are executed in order of optimum priority with a required efficiency depending on a structure of the IO system.

Japanese Unexamined Patent Application Publication No. S61-233837 discloses an interrupt processing method in which a CPU, a main storage unit, and multiple channel devices are connected through a memory bus. Interrupt priorities of the multiple channel devices are determined by using unique addresses assigned to the main storage unit, and interrupt signals are sent to the CPU through interrupt signaling lines provided to each channel device according to the interrupt priorities.

SUMMARY

Various embodiments of the present invention provide an information processing apparatus connected with an IO device, having a processing unit, a channel device transferring data between the information processing apparatus and the IO device having a activation controller activating the channel device, a storage device having a predetermined area storing a result operation executed by the channel device, an interrupt controller controlling an interrupt required by the channel device to the processing unit, a channel device controller controlling the channel device and a driver writing a request for a first interrupt in the predetermined area of the storage device through the channel device and requiring the first interrupt to the processing unit by using the interrupt controller, wherein the processing unit executes driver commands for reading information stored in the predetermined area and requesting the first interrupt when the processing unit detects the request for the first interrupt.

Various embodiments of the present invention provide an information processing system including an information processing apparatus having a processing unit, an IO device connected to the information processing apparatus, a channel device transferring data between the information processing apparatus and the IO device, the channel device having a activation controller activating the channel device, a storage device having a predetermined area storing a result operation executed by the channel device, an interrupt controller controlling an interrupt required by the channel device to the processing unit, a channel device controller controlling the channel device, and a driver writing a request for a first interrupt in the predetermined area of the storage device through the channel device and requiring the first interrupt to the processing unit by using the interrupt controller, wherein the processing unit executes driver commands for reading information stored in the predetermined area and requesting the first interrupt when the processing unit detects the request for the first interrupt.

Various embodiments of the present invention provide a control method of an information processing apparatus connected with an IO device, having a processing unit, a storage device, a channel device including an interrupt controller transferring data between the information processing apparatus and the IO device, the method including writing a request for a first interrupt in a predetermined area of the storage device by the channel device, requiring the first interrupt to the processing unit by using the interrupt controller, reading the request for the first interrupt from the predetermined area by the processing unit when the processing unit detects the request for the first interrupt, and executing the first interrupt by using the interrupt controller when the first interrupt required by the channel device is accepted when other processes to be prioritized over the request for the first interrupt by the processing unit do not exist, and executing the first interrupt by using the interrupt controller after the processing unit executes other processes when the request for the first interrupt is not accepted because the other processes to be prioritized over the request for the first interrupt exist.

DESCRIPTION OF THE PREFERRED EMBODIMENTS

Figure 1:
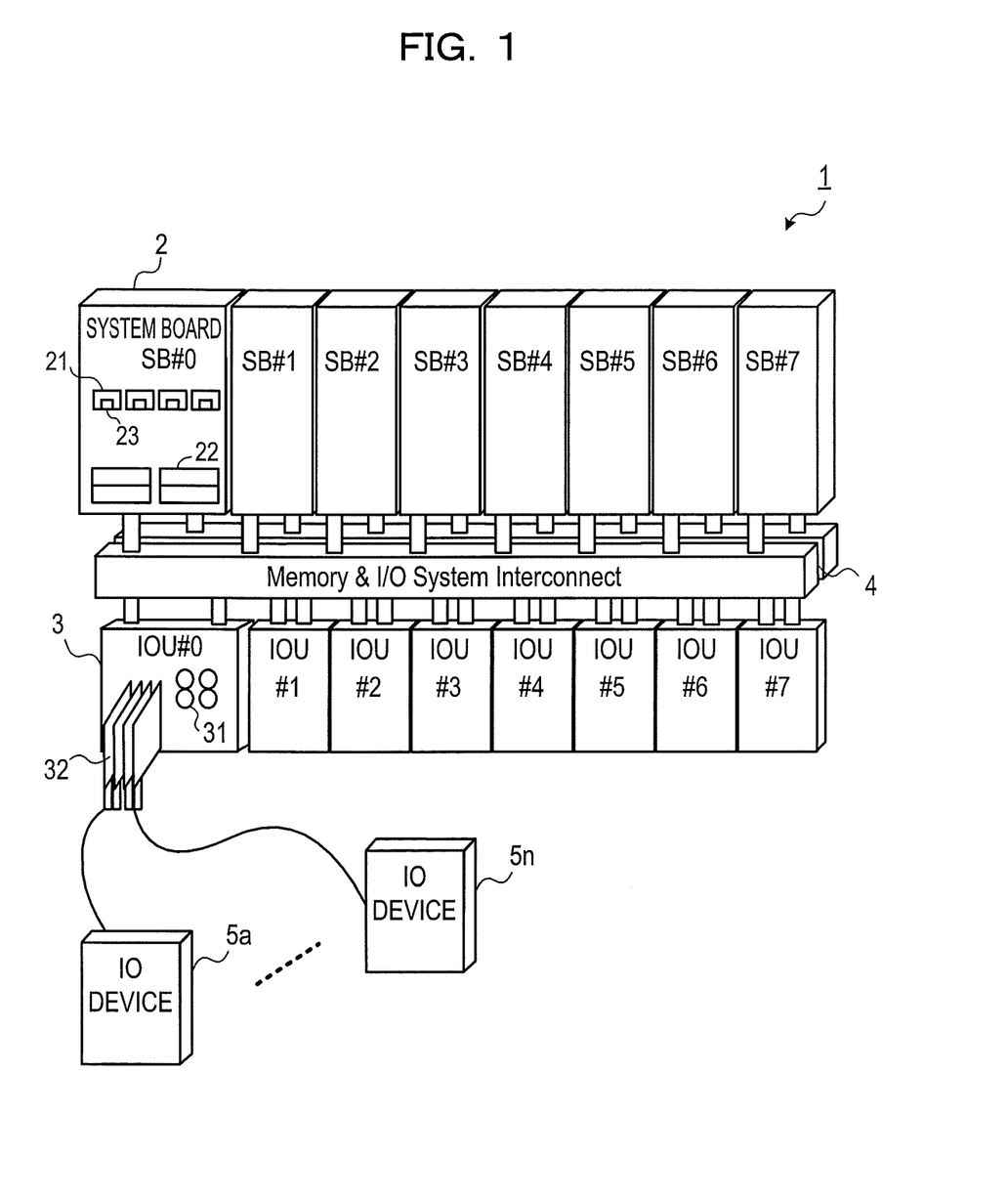
FIG. 1 illustrates a structure of an information processing system according to an embodiment of the present invention.

FIG. 1 illustrates the structure of the information processing system according to an embodiment of the present invention. Information processing system 1 has system boards 2 (#0 through #7), IO units 3 (#0 through #7), system interconnection 4 and IO devices 5 (#5a through #5n). The numbers of system boards 2 and IO units 3 are not considered to be limited the number described above. The numbers of system boards 2 and IO units 3 may be either the same or different.

Each system board 2 has CPUs 21 and memory 22. System board 2 (#0) shown in FIG. 1 has four CPUs 21. Memory 22 may be shared by multiple CPUs 21. Alternatively, memory 22 may be provided to each of CPUs 21.

Each CPU 21 has driver 23 for controlling a connection with IO unit 3. Each driver 23 is implemented by, for example, executing a drive program stored in memory 22.

Each IO unit 3 serves an IO device for information processing system 1. Each IO unit 3 has a PCI bus connected with system interconnection 4. For example, hard disk drives 31, channel devices 32, a LAN port, an IO unit such as a CD-ROM drive or a DVD drive are connected on the PCI bus.

IO unit 3 (#0) shown in FIG. 1 has four hard disk drives 31 and four channel devices 32. Channel device 32 is, for example, a card interface device, and connected with IO device 5. A structure of IO units 3 (#0 through #7) may be either the same or different from each other. IO units 3 (#1 through #7) also may not have hard disk drives 31, channel devices 32 or the LAN port.

System interconnection 4 has, for example, chip sets, and interconnects system boards 2 (#0 through #7) with IO units 3 (#0 through #7). System interconnection 4 is structured redundantly. For example, system interconnection 4 has a dual structure. IO devices 5a through 5n are, for example, storage devices in RAID configuration and connected with channel device 32.

Figure 2:
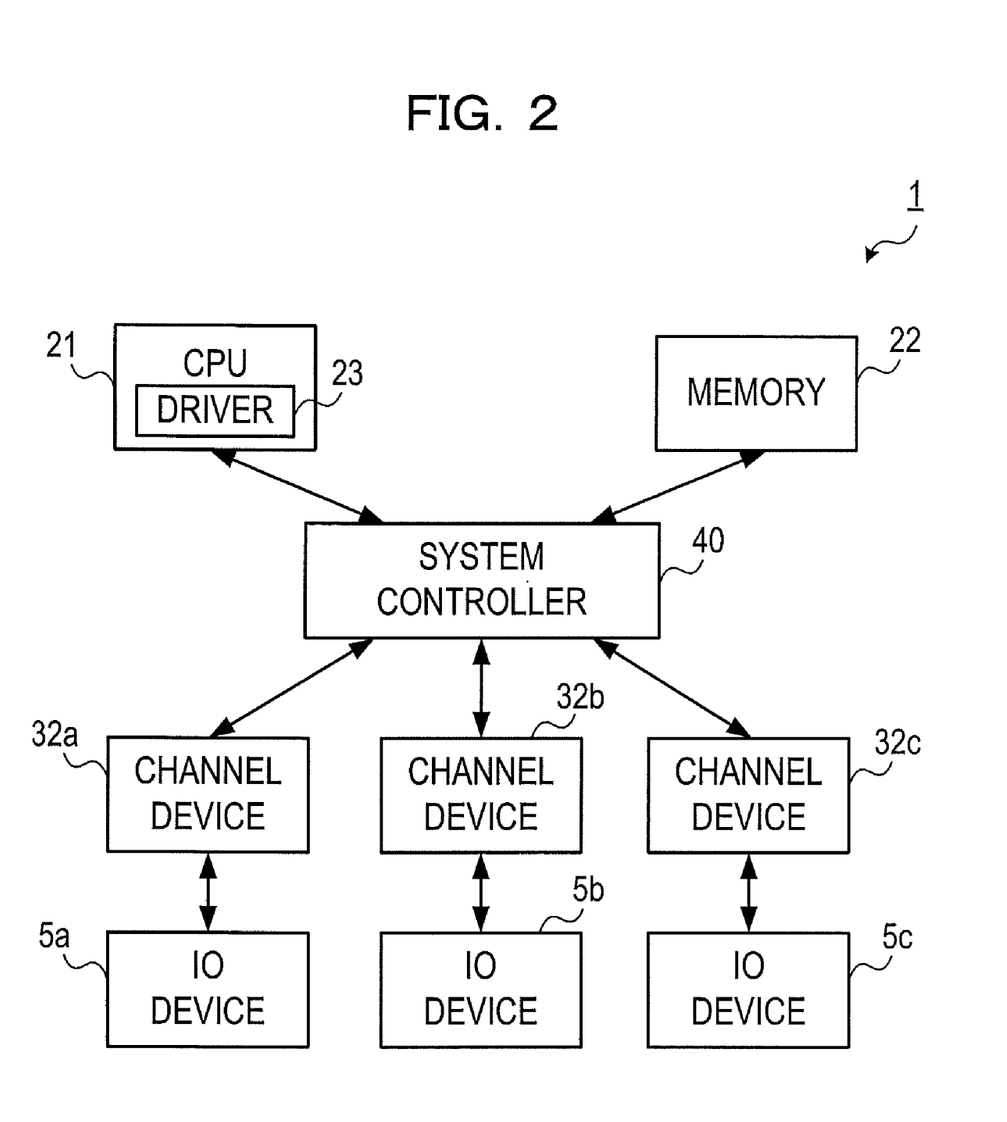
FIG. 2 illustrates a schematic view of the information processing system according to an embodiment of the present invention.

FIG. 2 is the schematic view of information processing system 1 shown in FIG. 1. One of the system boards 2 (#0 through #7) shown in FIG. 1 has CPU 21 and memory 22 shown in FIG. 2. System controller 40 includes system interconnection 4 shown in FIG. 1, and interconnects CPU 21, memory 22 and channel devices 32a through 32c. CPU 21 accesses memory 22 through system controller 40 as shown in FIG. 2. However, CPU 21 may also access to memory 22 directly.

Channel devices 32a through 32c control the data transfers between CPU 21, memory 22 and IO devices 5a through 5c. Channel devices 32a through 32c transfer data to each of IO devices 5a through 5c. Channel devices 32a through 32c may or may not be provided in a single IO unit 3. Each of channel devices 32a through 32c may or may not be connected with each of IO devices 5a through 5c. For example, a single channel device 32 may be connected with multiple IO devices 5 or multiple channel devices 32 may be connected with a single IO device 5.

For information processing system 1 having a structure described above, driver 23 activates channel devices 32a through 32c. For example, driver 23 activates channel device 32a to execute a command for transferring data to IO device 5a.

CPU 21 controls the channel devices by using driver 23. Each of channel devices 32a through 32c require an interrupt priority to activate respective IO device 5a through 5c corresponding to each channel device 32. If only one channel device, e.g., channel device 32a, requires the interrupt priority, the interrupt priority may be given to channel device 32a. Therefore, channel device 32a starts operations for transferring data from IO device 5a that corresponds to channel device 32a. If multiple channel devices, for example, channel devices 32a and 32b require the interrupt priorities, driver 23 controls the channel devices according to a specific algorism and determines the interrupt priorities of the channel devices. If the interrupt priority is given to channel device 32a under the control of driver 23, channel device 32b does not start operations for transferring data from IO device 5b that corresponds to channel device 32b. In short, channel device 32b waits for driver 23 to issue a command. After transferring the data by channel device 32a, driver 23 gives the interrupt priority to channel device 32b. Driver 23 may control the channel devices or a higher-lever application may control the channel devices in conjunction with driver 23.

For information processing system 1 according to an embodiment of the present invention, channel device 32 starts to control the IO devices according to the command issued by driver 23 or after obtaining the interrupt priority from driver 23 as described above. In other words, channel device 32 does not start to control the IO devices without obtaining the interrupt priority from driver 23.

Figure 3:
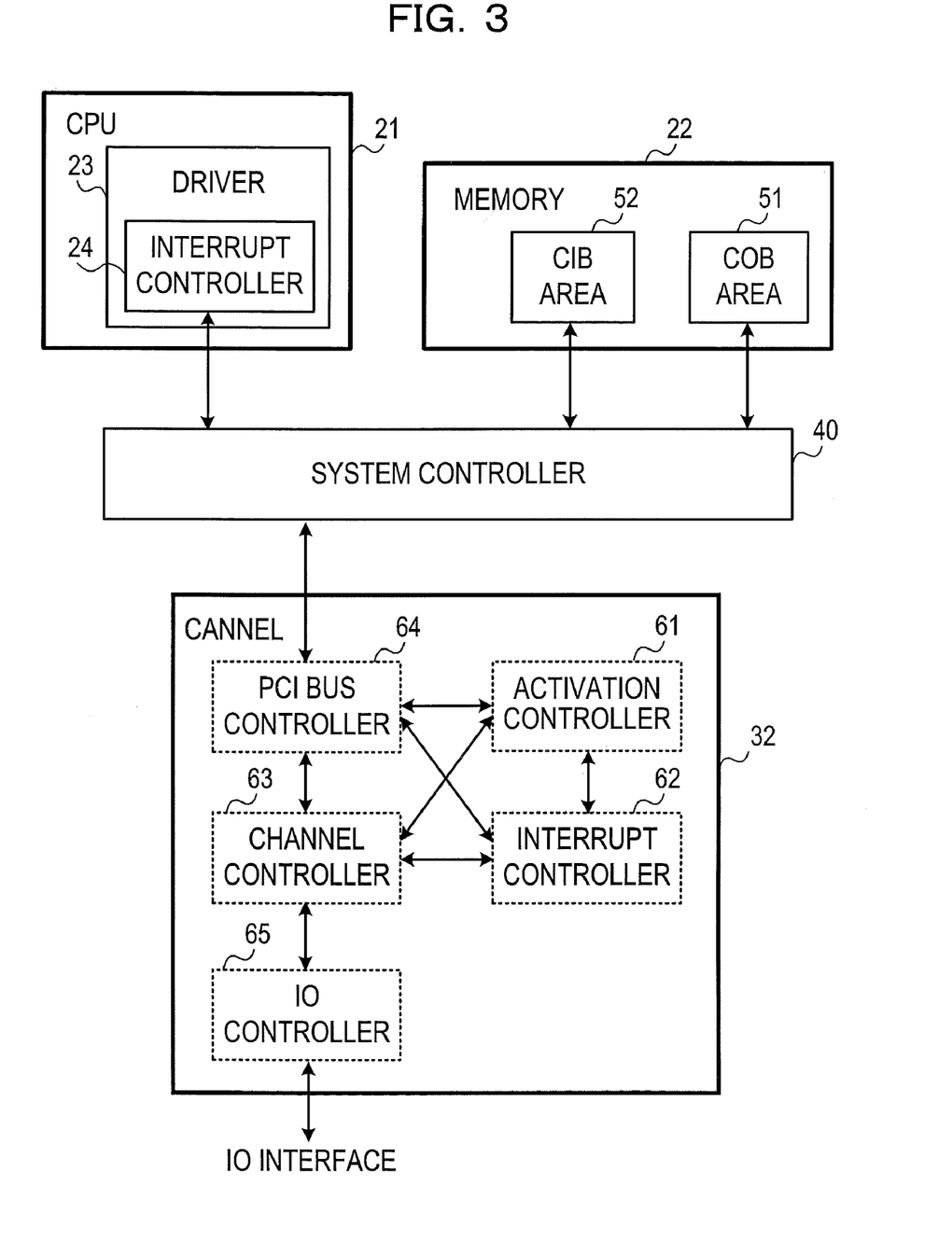
FIG. 3 illustrates components associating with an interrupt control.

FIG. 3 illustrates the components associated with the interrupt control executed by information processing system 1 according to an embodiment of the present invention. Channel device 32 shown in FIG. 3 is equivalent to one of the multiple channel devices shown in FIG. 1 or 2.

CPU 21 has driver 23 as described above. Driver 23 has interrupt controller 24. Interrupt controller 24 receives an interrupt required by channel device 32 and executes a process according to the interrupt.

Memory 22 is, for example, a semiconductor memory, and used as a main memory of CPU 21. Memory 22 has channel operation buffer (COB) area 51 and channel interruption buffer (CIB) area 52. Driver 23 allocates COB area 51 and CIB area 52 to each of channel devices 32. If a new channel device 32 is connected to information processing system 1, driver 23 allocates COB area 51 and CIB area for the newly connected channel device 32 in memory 22.

COB area 51 is used to store commands for operating channel device 32, which is issued by driver 23. In this embodiment, COB area 51 stores commands for activating channel device 32 and activation information necessary for activating channel device 32. CIB area 52 is used for notifying control information to driver 23 by channel device 32. In this embodiment, CIB area 52 stores information about results of operations executed by channel device 32 and information about the requests from channel devices 32 to CPU 21, etc.

Channel device 32 has activation controller 61, channel device controller 63, PCI bus controller 64 and IO controller 65. These components 61 through 65 may be implemented by hardware or a combination of the hardware including firmware and software.

Activation controller 61 activates channel device 32 according to a command issued by driver 23. In this embodiment, activation controller 61 has a register. When a specific value is written in the register by channel device 32, activation controller 61 reads the information stored in COB area 51 of memory 22 and transfers the information to channel device controller 63. Therefore, channel device 32 is activated.

Interrupt controller 62 controls an interrupt to CPU 21 requested by channel device 32. In this embodiment, interrupt controller 62 sends an interrupt signal to CPU 21 when an operation executed by channel device 32, for example, a data transfer, is completed. Additionally, interrupt controller 62 sends an interrupt signal to CPU 21 when requesting an interrupt priority. Interrupt controller 24 included in CPU 21 receives a request for the interrupt from channel device 32 and then reads the information stored in CIB area 52, which corresponds to the channel device that interrupts. Therefore, an operation corresponding to the interrupt request is executed.

Channel device controller 63 controls operations of channel device 32 for transferring data to the corresponding IO device 5. PCI bus controller 64 controls PCI bus for transferring data between channel device controller 63, CPU 21 and memory 22 under the control of channel device controller 63. IO controller 65 controls a data transfer between the corresponding IO device 5 under the control of channel device controller 63.

Figure 4:
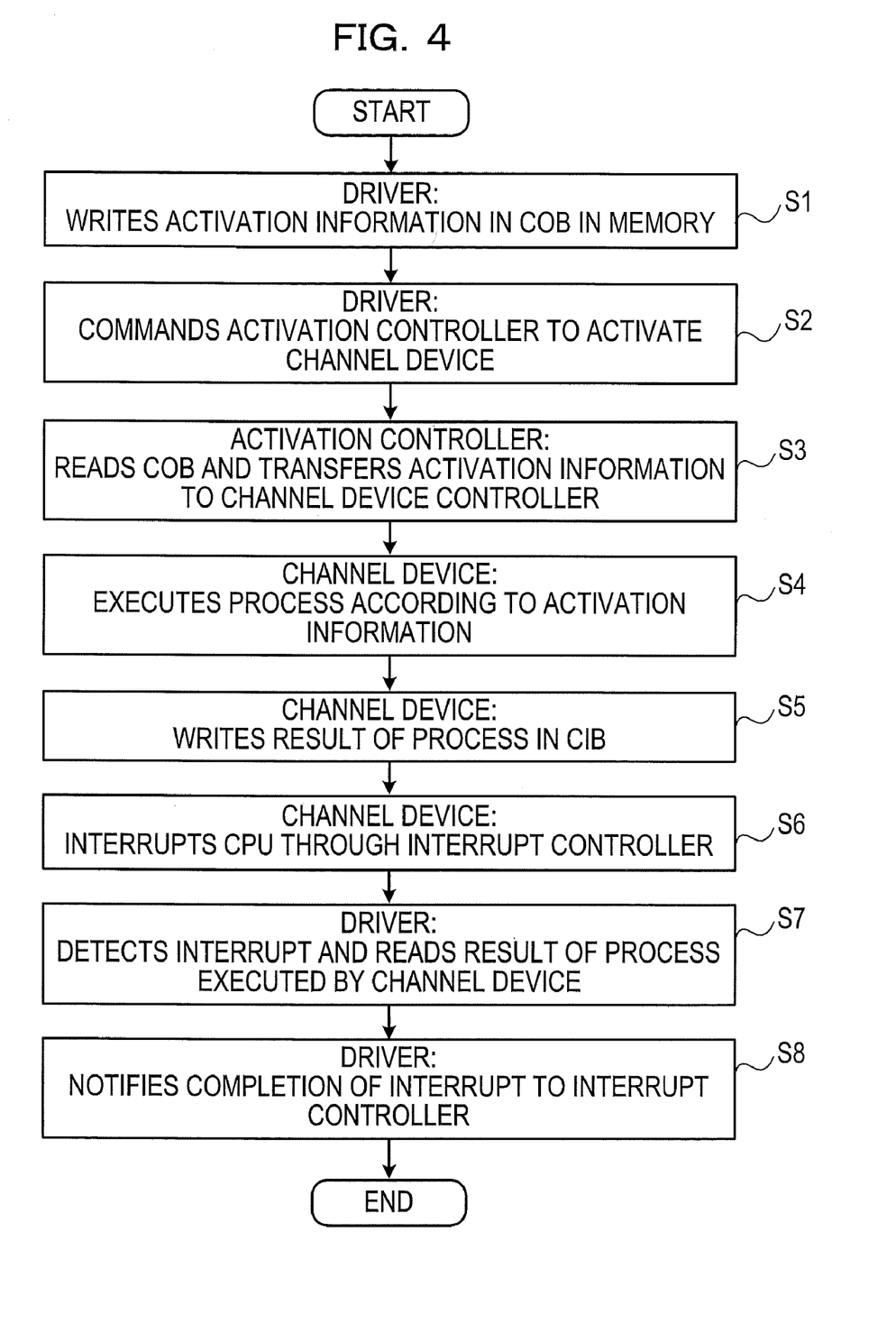
FIG. 4 is a flow chart for activating channel device, which starts with a process executed by driver.

FIG. 4 is the flow chart for activating channel device 32, which starts with the process executed by driver 23. The flow chart shown in FIG. 4 starts with a process executed by driver 23. Driver 23 starts the processes shown in the flow chart in FIG. 4, for example, on a command issued by the application.

Driver 23 writes the activation information in the COB area 51 corresponding to the channel device to be activated in step S1. The activation information is needed for operating channel devices 32. For example, the activation information includes a pointer, the first address, data size, and last byte count for transferring data to channel device 32. The pointer specifies a command to be executed by channel device 32. The first address is the first address of areas of memory 22 in which the data to be transferred are stored. The data size indicates the size of the data to be transferred. The last byte count represents the byte count of the last chain data to be transferred. Alternatively, an instruction code may be written in COB area 51 instead of the pointer.

In step S2, driver 23 commands activation controller 61 included in the channel device to be activated to activate channel device 32. The command for activating the channel device is executed by writing the specific value indicating "channel device activation" in the register included in activation controller 61 in this embodiment.

Activation controller 61 included in channel device 32 to which the command for activation is issued reads the information stored in the COB area 51 corresponding to the channel device in step S3. In COB area 51, the activation information is written in step S1. In other words, activation controller 61 obtains the activation information written in COB area 51 by driver 23. Then activation controller 61 transfers the obtained activation information to channel device controller 63.

Channel device 32 executes a process according to the activation information read from COB area 51 in step S4. The activation information includes the pointer specifying a command for transferring data, the first address of data to be transferred and a data size. When receiving the activation information from activation controller 61, channel device 32 executes the command specified by the pointer included in the activation information transferred from activation controller 61. In other words, channel device 32 obtains data in size according to the data size at an address in memory 22 according to the first address, and then transfers the data to IO device 5 according to the command for transferring the data.

In step S5, channel device 32 writes a result of the process executed in step S4 in CIB area 52 corresponding to the channel device. When the data is successfully transferred in step S4, an end code indicating "a normal end" is written in CIB area 52 as a result of the process. If the data is not transferred successfully, an error code indicating a cause of the error is written in CIB area 52. If the data transmission is cancelled in progress, a data size of data transferred immediately before the cancel may be written in CIB area 52.

In step S6, interrupt controller 62 included in channel device 32 interrupts CPU 21. A method for interrupt is not limited. If CPU 21 has an interrupt terminal for each channel device, the interrupt is handled by changing a logical value of the corresponding interrupt terminal. Alternatively, the interrupt may be handled by transmitting information identifying the channel device to interrupt to CPU 21.

When driver 23 included in CPU 21 detects the interruption of the channel device, the driver 23 reads CIB area 52 corresponding to the channel device in step S7. In CIB area 52, the result of the process executed by the channel device has been written in step S5. Therefore, driver 23 reads the result of the process executed by channel device 32 from CIB area 52. In other words, CPU 21 reads the result of the process according to the activation information written in step S1.

When the data are transferred successfully, driver 23 notifies that the interrupt is completed to the channel device requiring the interrupt in step S8. The notification is implemented by, e.g., writing a specific value indicating "a completion" in the register included in interrupt controller 62.

For information processing system 1, channel device 32 is activated by driver 23 included in CPU 21. The activation controller included in channel device 32 is implemented by communicating information between driver 23 and channel device 32 through COB area 51 and CIB area 52. The interruption requested to CPU 21 triggers CPU 21 to read CIB area 52.

Driver 23 commands CPU 21 to execute the processes in steps S1 through S2 and S7 through S8. Additionally, driver 23 commands channel device 32 to execute the processes in steps S3 through S6.

Figure 5:
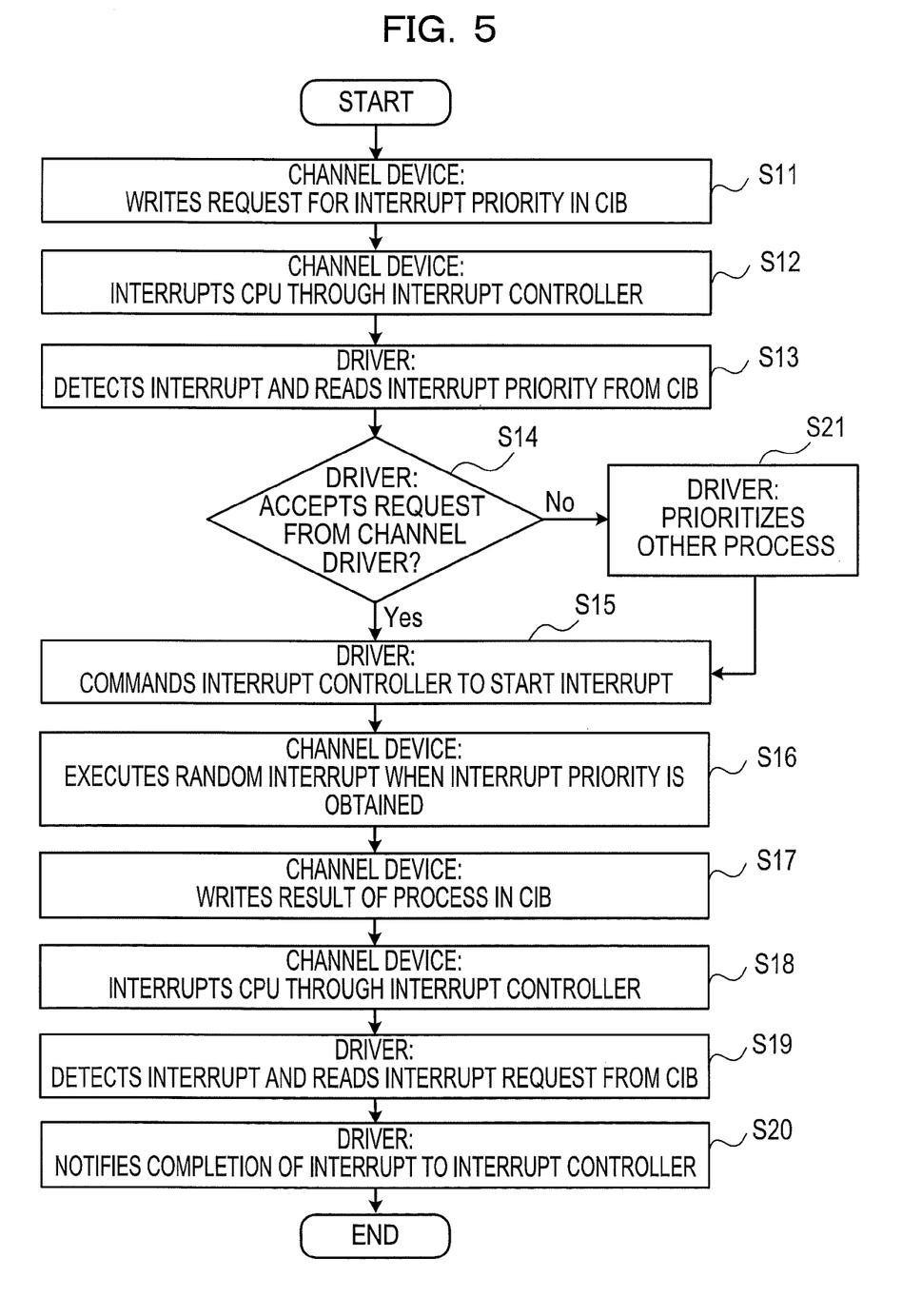
FIG. 5 is a flow chart illustrates processes executed when the channel device requires an interrupt priority.

FIG. 5 is the flow chart illustrating the processes when channel device 32 requires the interrupt priority. The request of the interrupt is equivalent to, for example, a request for reserving a computer resource to executer a process required by channel device 32 in this embodiment.

Channel device 32 writes the information about the request for the interrupt priority in CIB area 52 corresponding to the channel device in step S11. In other words, channel device 32 requires the interrupt priority to CPU 21 to reserve the necessary computer resource when transferring data read from IO device 5 to another device or when writing data in IO device 5.

In step S12, channel device 32 interrupts CPU 21 through interrupt controller 62. The interrupt is basically the same as the interrupt operation in step S6 shown in FIG. 4.

In step S13, when driver 23 included in CPU 21 detects the interrupt required by channel device 23, driver 23 reads CIB area 52 corresponding to the channel device in step S13 as in step S7. In CIB area 52, the information about the request for the interrupt priority has been written by channel device 32 in step S11. Therefore, driver 23 reads the information that channel device 32 requires the interrupt priority from CIB area 52.

In step S14, driver 23 judges whether to accept the request for the interrupt priority read in step S13. In some cases, CPU 21 may prioritize a process required by the application over the request for the interrupt priority. In this case, driver 23 does not accept the request from channel device 32 until the request from the application is completed. In other cases, CPU 21 receives the requests for the interrupt priorities from multiple channel devices 32. In this case, if driver 23 accepts the request for the interrupt priority from a channel device, e.g., channel device 32b, when receiving the request for the interrupt priority from other channel device, e.g., channel device 32a, driver 23 does not accept the request from channel device 32a until the request from channel device 32b is completed. As described above, driver 23 judges whether to accept the request for the interrupt priority according to the operation status of information processing system 1. If the request from channel device 32 is accepted, the process moves on to step S15.

In step S15, driver 23 commands to start to handle the interrupt to interrupt controller 62 included in the channel device 32 requiring the interrupt priority in step S11. The command for starting the interrupt is executed by writing a specific value indicating "a start", for example, setting an "accept-bit", in the register included in interrupt controller 62.

When interrupt controller 62 detects the command issued by driver 23, channel device 32 judges that the request for the interrupt priority is accepted and executes the required process in step S16. In this case, the data is transferred from corresponding IO device 5 on a command for the random interrupt.

Steps S17 through S20 are basically the same as the processes in steps S5 through S8 shown in FIG. 4. Channel device 32 writes the result of the process executed by channel device 32 in CIB area 52 in step S17. Interrupt controller 62 interrupts CPU 21 in step S18. When driver 23 detects the interrupt required by channel device 32, driver 23 reads CIB area corresponding to the channel device. In other words, CPU 21 reads the result of the process according to the request for the interrupt priority written in step S11. Driver 23 notifies that the interrupt processing is completed to the channel device required the interrupt in step S20.

If the request for the interrupt priority written in step S11 is not accepted (step S14, No), the process moves on to step S21.

In step S21, driver 23 executes other process prioritized over the request written in step S11. After executing the higher priority request in step S21, driver 23 may go back to step S15 and handle the lower priority request, the request for the interrupt priority. In other words, if the drive does not accept the request from the channel device, driver 23 may handle the request for the interrupt priority required by the channel device after CPU 21 executes the higher priority request required by other channel device.

For information processing system 1 according to this embodiment of the present invention, channel device 32 executes the required process after obtaining the acceptance of driver 23 included in CPU 21. In other words, channel device 32 cannot execute processes independently without the acceptance of driver 23. The priority control is implemented by transmitting the information between driver 23 and channel device 32 through CIB area 52 in memory 22. The interrupt to CPU 21 triggers CPU 21 to read CIB area 52 as the processes shown in FIG. 4.

Driver 23 commands CPU 21 to execute steps S13 through S15 and S19 through S21. Additionally, driver 23 commands channel device 32 to execute steps S11 through S12 and S16 through S18.

Figure 6:
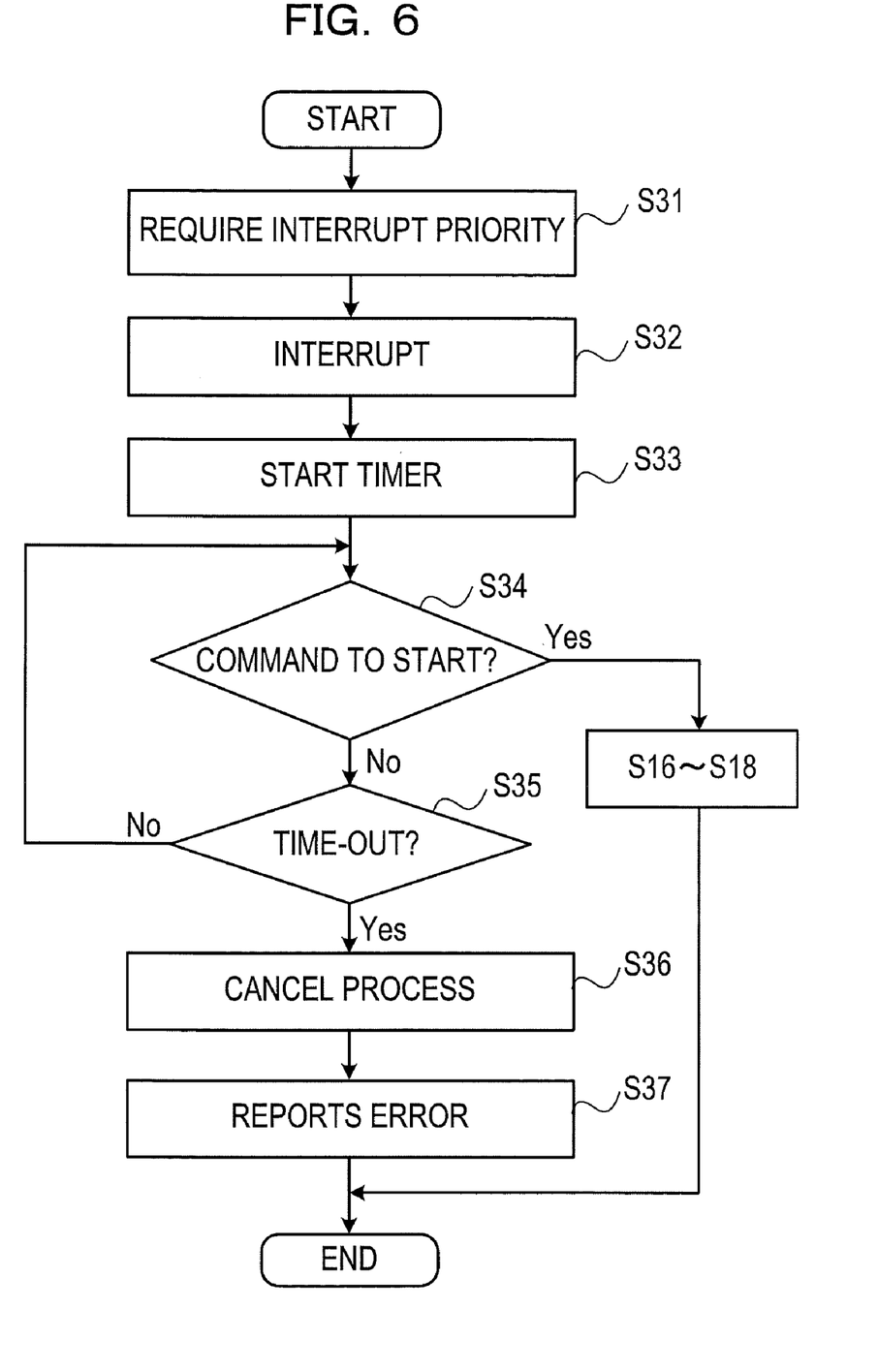
FIG. 6 is a flow chart illustrating processes when the interrupt priority is not accepted.

FIG. 6 is the flow chart illustrating the processes when the interrupt priority is not accepted. The processes shown in the flow chart are executed by channel device 32.

Steps S31 and S32 are equivalent to steps S11 and S12 shown in FIG. 5. In other words, channel device 32 requires the interrupt priority to driver 23 by using CIB area 52 and interrupts CPU 21.

Interrupt controller 62 starts a timer in step S33. In other words, interrupt controller 62 monitors elapsed time from when the interrupt controller 62 requires the interrupt priority or from when interrupt controller 62 interrupts CPU 21. Interrupt controller 62 waits for a response from driver 23 in steps S34 through S35. When interrupt controller 62 detects the response from driver 23, i.e., a command for starting the interrupt in step S15 shown in FIG. 5, within a specified period of time in step S15 shown in FIG. 5 (S34, Yes), channel device 32 executes steps S16 through S18 shown in FIG. 5.

If the response from driver 23 is not detected in the specified period of time (S35, Yes), interrupt controller 62 notifies that a time-out error is caused to channel device controller 63 in step S36. Then channel device 32 cancels the request required in steps S31 through S32. In step S37, channel device 32 reports that channel device 32 failed to obtain the interrupt priority to, e.g., IO device 5, in step S37. The error is reported to CPU 21 as needed.

In the processes shown in FIGS. 5 and 6, driver 23 does not notify anything to channel device 32 when the interrupt priority is not given to the channel device. However, driver 23 may notify that the interrupt priority is not given to the channel device. For example, driver 23 starts the timer when detecting the interrupt in step S12. If the interrupt priority is not given to the channel device in the specified period of time, driver 23 reports the error to the channel device requiring the interrupt or channel device controller 63 included in the channel device. On receiving the error report, channel device 32 cancels the request for the interrupt priority. In other words, the error report is equivalent to a command for cancelling the request from channel device 32.

When receiving the command for activation from driver 23 in the specific period of time for requiring the interrupt priority, channel device 32 prioritizes the command for activation. On receiving the command for activation described in FIG. 4 from driver 23 in the specific period of time starting from the point when channel device 32 requires the interrupt priority and to the point when driver 23 receives the command for activation, i.e., steps S11 through S15, activation controller 61 reports that obtaining the interrupt priority has failed to channel device controller 63. Then channel device 32 cancels the request for interrupt priority because the command for activation issued by driver 23 is prioritized over the request for interrupt priority.

Accordingly, information processing system according to an embodiment of the present invention implements the interrupt control between the drive and the driver and the channel device in an emulation environment. Therefore, functions implemented in conventional main frames are maintained in the general-purpose platform. For example, there has been a structure providing a function for multipass connecting an information processing unit included in a mainframe with an IO device by using multiple channel devices as an embodiment of the mainframe. The multipass connection is a method to continue data transfer by the second channel device if the first channel device has failed in progress of transferring chain data between the information processing unit and the IO device by using the first channel device. The information processing system according to an embodiment of the present invention may provide the multipass function described above.

Next, the control method using generation byte will be disclosed. The generation byte is used for checking whether writing data in CIB area by channel device 32 has failed by utilizing a characteristic that the generation byte is incremented every time the channel device writes data in CIB. More specifically, channel device 32 transfers the control information to CPU 21 by using CIB area 52 as described above. Channel device 32 writes the generation byte together with the control information to be transferred in CIB area 52. The generation byte is a sequence number to identify the control information written in CIB area 52, and added in increments of 1 when new control information is written. Driver 23 reads the control information from CIB area 52 with reference to the generation byte. Therefore, executing processes corresponding to the old control information may be avoided. If the generation byte is "4" when fifth writing in CIB area 52 is attempted, the generation byte indicates that the writing in CIB area 52 has failed one time. If the generation byte is "5" when the fifth writing is attempted, an overlap of the fifth writing may be avoided. As described above, failures of the writing in CIB area 52 by channel device may be detected together with the overlap of the writing in CIB area 52 by utilizing the generation byte.

By using the generation byte, a processes equivalent to the processes activation shown in FIG. 4 and the processes for obtaining the interrupt priority shown in FIG. 5 may be implemented without interrupting CPU 21 by channel device 32.

Figure 7:
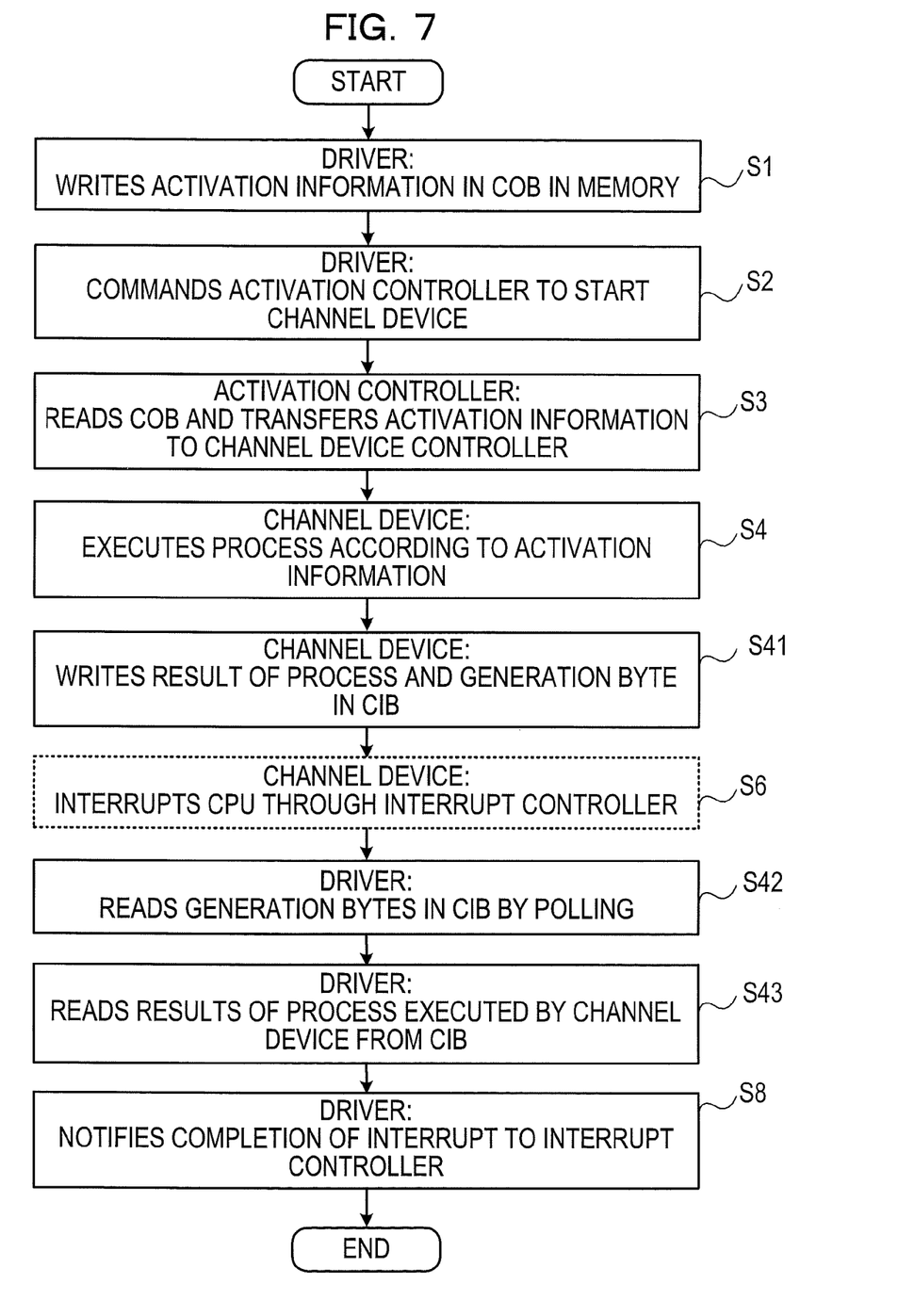
FIG. 7 is a flow chart illustrating processes when a generation byte is used to activation the channel device.

FIG. 7 is the flow chart illustrating the processes using the generation byte in activating channel device 32. When the generation byte is used, step S41 is executed instead of step S15 shown in FIG. 5. In step S41, channel device 32 writes a result of a process and a new generation byte corresponding to the result of the process in CIB area 52. Thus, the generation byte is added in increments of 1. Channel device 5 does not interrupt CPU 21 thereafter.

Driver 23 reads the generation byte configured in CIB area 52 periodically by polling in step S42. Driver 23 stores the generation byte written in CIB in polling last time, and compares the previous generation byte with a new generation byte configured in the latest polling. If the new generation byte configured in CIB area is incremented, the control information written in CIB area, i.e., the result of the process executed by channel device 32, is read. Then driver 23 notifies a completion of the interrupt to channel device 32.

Figure 8:
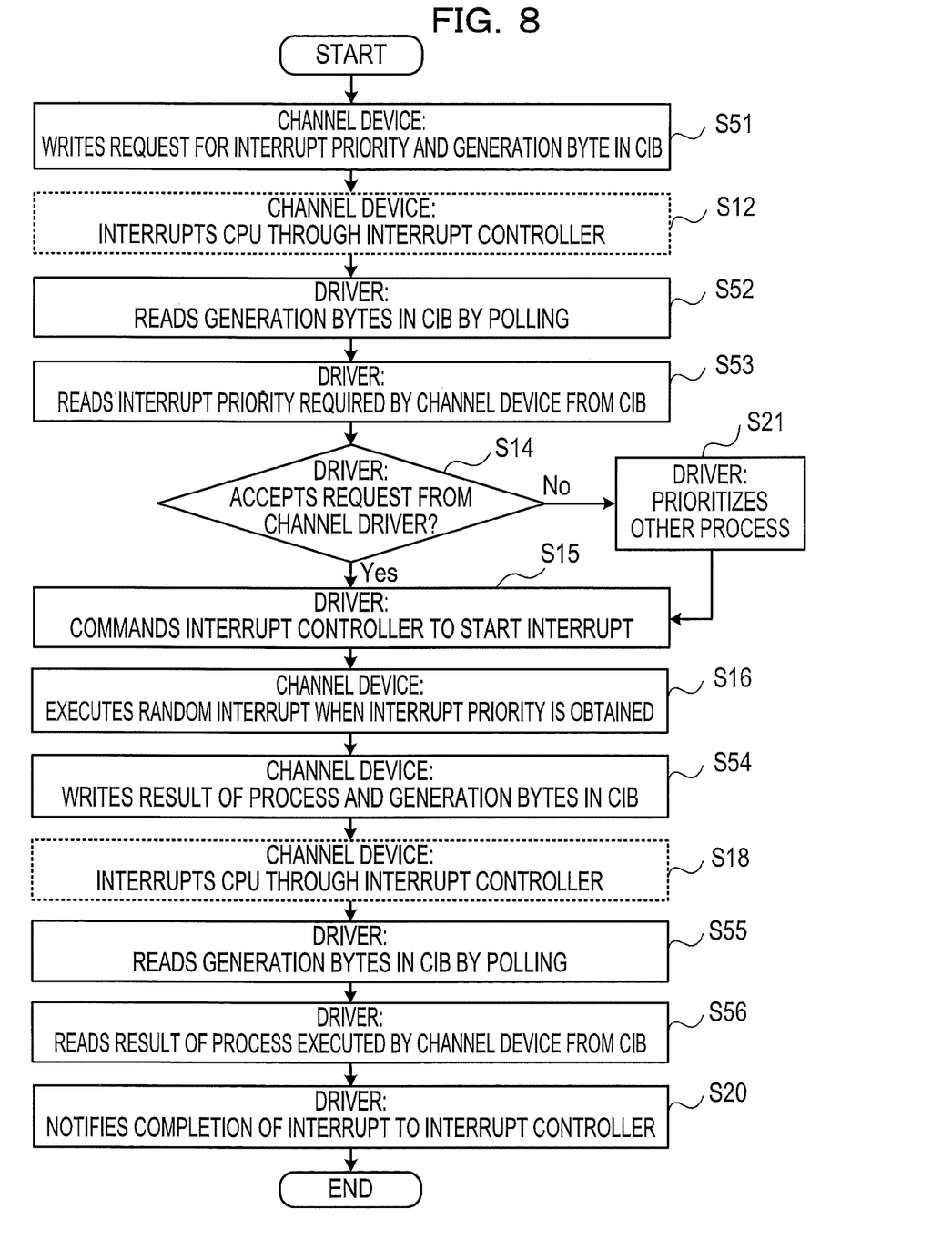
FIG. 8 is a flow chart illustrating processes when the generation byte is used to require the interrupt priority.

FIG. 8 is the flow chart illustrating the processes when the generation byte is used in requesting the interrupt priority. When the generation byte is used, channel device 32 associates the request for the interrupt priority with the new generation byte and write the request for the interrupt priority and the generation byte in CIB area 52 in step S51 instead of step S11.

Driver 23 reads the generation byte configured in CIB area 52 periodically by polling in step S52. When driver 23 detects that the generation byte configured in CIB area 52 is incremented, driver 23 reads the request for the interrupt priority required by channel device 32 from CIB area 52 in step S53. Then driver 23 executes the processes in steps 14 and successive steps.

Channel device 32 writes the result of the process and the new generation byte in CIB area 52 in step S54 instead of executing step S17. In this case, channel device 32 does not interrupt CPU 21.

Driver 23 reads the generation byte periodically by polling in step S55. When driver 23 detects that the generation byte is incremented, driver 23 reads the result of the process executed by channel device 32 from CIB area in step S56.

The methods and processes described herein can be implemented by executing a prepared program by a computer such as a personal computer or a workstation. This program is executed by being recorded on a computer-readable recording medium such as a hard disk, a flexible disk, a CD-ROM, an MO, or a DVD and being read from the recording medium by the computer. This program may be a transmission medium capable of being distributed through a network such as the Internet.

The present invention has been described with respect to one or more specific embodiments. However, it is to be understood that the invention is not limited to these specific embodiments, and many modifications to these embodiments are possible within the scope of the invention, which is defined in the appended claims.

What is claimed is:

1. An information processing apparatus connected with an IO device, comprising:
   a processing unit;
   a channel device connected to the IO device and to the processing unit through a system controller and configured to transfer data between the information processing apparatus and the IO device;
   a storage device connected to the processing unit and the channel device through the system controller and having a predetermined area for storing a result of an operation executed by the channel device and information indicating a request from the channel device to the processing unit;
   an interrupt controller incorporated in the channel device and configured to control an interrupt requested by the channel device to the processing unit;
   a channel device controller configured to control the channel device;
   a driver incorporated in the processing unit; and
   an activation controller configured to activate the channel device according to a command issued by the driver, read information stored in the predetermined area, and transfer the read information to the channel device controller, wherein
   the processing unit writes activation information used for activating the channel device into the predetermined area of the storage device and sends a command for activation to the channel device, and the channel device reads the information stored in the predetermined area when the command is received, executes an activation operation, and writes a result of the activation operation into the predetermined area and sends an interrupt to the processing device upon completion of the activation operation.

2. An information processing system, comprising:

an information processing device that includes an arithmetic processing device and a storage device;

an IO unit that is connected to the information processing device; and a channel device transferring data between the information processing device and the IO unit, wherein the storage device includes:
- a first area for storing a channel device activation command for activating the channel device and activation information to be used for activation of the channel device; and
- a second area for storing a result of an operation executed by the channel device, the channel device includes:
- an activation controller controlling activation of the channel device;
- an interrupt controller controlling an interrupt from the channel device to the arithmetic processing device; and
- a channel device controller controlling the channel device, and the information processing device further comprises a driver, the driver causing the arithmetic processing device to:
- write the channel device activation command and the activation information into the first area of the storage device; and
- instruct the activation controller to activate the channel device;

causing the activation controller to:
- read information stored in the first area of the storage device and notify the channel controller of information read from the first area;

causing the channel device to:
- execute the channel device activation command in the first area of the storage device;
- write a result of the execution of the activation command into the second area of the storage device; and
- issue an interrupt to the arithmetic processing device by using the interrupt controller; and causing the arithmetic processing device to:
- refer to information stored in the second area of the storage device and read the result of the operation executed by the channel device from the second area;
- execute a process that corresponds to the interrupt; and
- notify the channel device of completion of the executed process to the interrupt controller.

3. An information processing system, comprising:

an information processing device that includes an arithmetic processing device and a storage device;

an IO unit that is connected to the information processing device; and a channel device that transfers data between the information processing device and the IO unit, wherein the storage device includes:
- a first area storing a channel device activation command for activating the channel device and activation information to be used for activation of the channel device, the channel device includes:
- an activation controller controlling activation of the channel device;
- an interrupt controller controlling an interrupt from the channel device to the arithmetic processing device; and
- a channel device controller controlling the channel device, and the information processing device further comprises a driver, the driver causing the arithmetic processing device to:
- write the channel device activation command and the activation information into the first area of the storage device; and
- instruct the activation controller to activate the channel device;

causing the activation controller to:
- read information stored in the first area of the storage device and notify the channel controller of information read from the first area;

causing the channel device to:
- execute the channel device activation command in the first area of the storage device; and
- issue an interrupt to the arithmetic processing device by using the interrupt controller.

* * * * *